US000001161H

United States Statutory Invention Registration [19]

[11] Reg. Number: H1161

Berggren et al.

[43] Published: Apr. 6, 1993

[54] AQUEOUS COAL SLURRY

[75] Inventors: Mark H. Berggren, Golden; Francis J. Smit, Arvada; Wilbur W. Swanson, Golden, all of Colo.

[73] Assignee: The United States of America as represented by the United States Department of Energy, Washington, D.C.

[21] Appl. No.: 428,682

[22] Filed: Oct. 30, 1989

[51] Int. Cl.[5] ..... C10L 1/32
[52] U.S. Cl. ..... 44/280
[58] Field of Search ..... 44/51, 77

[56] References Cited

U.S. PATENT DOCUMENTS

| | | | |
|---|---|---|---|
| 4,088,453 | 5/1978 | Wiese et al. | 44/51 |
| 4,217,109 | 8/1980 | Siwersson et al. | 44/1 SR |
| 4,261,701 | 4/1981 | Schulz et al. | 44/51 |
| 4,302,212 | 11/1981 | Yamamura et al. | 44/51 |
| 4,375,358 | 3/1983 | Swartz et al. | 44/51 |
| 4,436,528 | 3/1984 | Schick et al. | 44/51 |
| 4,455,149 | 6/1984 | Satake et al. | 44/51 |
| 4,472,170 | 9/1984 | Hellyer | 44/51 |
| 4,500,041 | 2/1985 | Nakaoji et al. | 241/16 |
| 4,552,568 | 11/1985 | Igarashi et al. | 44/51 |
| 4,597,770 | 7/1986 | Forand et al. | 44/51 |
| 4,650,496 | 3/1987 | Funk | 44/51 |
| 4,652,271 | 3/1987 | von Rybinski et al. | 44/51 |
| 4,713,086 | 12/1987 | Smit et al. | 44/51 |
| 4,744,797 | 5/1988 | Shimada et al. | 44/51 |
| 4,770,352 | 9/1988 | Takamoto et al. | 44/51 |

OTHER PUBLICATIONS

Staley Industrial Products, Technical Data.

Berggren and Swanson, "Development of Dispersing Additives for Ultra-Clean Coal-Water Slurry Fuels", Twelfth International Conference on Slurry Technology, 1987.

Berggren and Swanson, Final Report, Contract No. DE-AC22-85PC80262.

*Primary Examiner*—Robert L. Stoll
*Assistant Examiner*—Joseph D. Anthony
*Attorney, Agent, or Firm*—Hugh W. Glenn; Robert J. Fisher; William R. Moser

[57] ABSTRACT

An aqueous slurry containing coal and dextrin as a dispersant. The slurry, in addition to containing dextrin, may contain a conventional dispersant or, alternatively, a pH controlling reagent.

7 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AQUEOUS COAL SLURRY

CONTRACTUAL ORIGIN OF THE INVENTION

The U.S. Government has rights in this invention pursuant to Contract No. DE-AC22-85PC80262 between the U.S. Department of Energy and AMAX Research & Development Center.

BACKGROUND OF THE INVENTION

The present invention is directed to a coal slurry and, more particularly, to an aqueous coal slurry containing dextrin as a dispersant.

Many high-intensity combustion systems require that coal be cleaned to very low levels of ash to prevent excessive wear of high-temperature, high-speed components. For these applications, the cleaned coal must contain very low levels of alkali metals in order to prevent vaporization and subsequent deposition of corrosive inorganic constituents.

When prepared as coal-water slurry fuel, the cleaned coals are often ground to a very fine particle size distribution to insure adequate combustion. The high surface area of cleaned, micronized coals can result in large demands for dispersants to achieve solids loadings suitable for specialized high-intensity combustion systems operating with coal-water slurry fuels. Because the dosages of the dispersant are generally greater than those required for coarser coal slurries for use in large industrial or utility boilers, the chemical composition of the dispersant becomes more important.

A number of different dispersants for coal-water slurry production have been utilized in the industry. An example is U.S. Pat. No. 4,088,453 wherein ammonia is added to a coal-water slurry to improve pumpability. Many other dispersants incorporate the use of polyelectrolytes and sulfonates.

Upon combustion, alkali additions resulting from the use of an alkali-containing dispersant may have marked negative effects on ash characteristics when coal has been cleaned to low ash levels. Additionally, slurry sulfur values may also noticeably increase as a result of the use of a sulfur-containing dispersant.

SUMMARY OF THE INVENTION

A principal object of the invention is the provision of an aqueous coal slurry containing a dispersant, which is of low-cost and which contains very low or no levels of sodium, potassium, sulfur and other contaminants.

In connection with the foregoing object, it is an object of the invention to provide an aqueous slurry containing coal and dextrin as a dispersant.

Another object of the invention is to provide a method of preparing an aqueous coal slurry which includes the step of adding an effective amount of dextrin as a dispersant.

The invention consists of certain novel features and a combination of parts hereinafter fully described, and particularly pointed out in the appended claims, it being understood that various changes in the details may be made without departing from the spirit, or sacrificing any of the advantages of the present invention.

DESCRIPTION OF THE DETAILED EMBODIMENT

An embodiment of the invention is an aqueous slurry containing coal and dextrin as a dispersant.

According to the invention, the coal may be any one of several known varieties such as bituminous, anthracite, subbituminous, lignite and the like or mixtures thereof. The invention is particularly suitable for micronized coal in water but can be applied to carbonaceous particles or coarser coal particles.

According to the invention, the dextrin is water-soluble and unbleached. The dextrin comprises a partially hydrolized starch (i.e., a polysaccharide) which is prepared by the heating or dry roasting of starch in the presence of an acid catalyst. Since dextrin is colloidal in property and describes a class of substances, it has no definite formula. Although STADEX® 120 and 126 dextrin manufactured by the Staley Manufacturing Company, Decatur, Illinois has been utilized, it is understood that the present invention is applicable to any type of dextrin.

The concentration of coal in the aqueous slurry will range from about 44% to 61% by weight. The concentration of dextrin in the aqueous slurry will range from about 0.01% to 2.00% by weight.

In addition to the dextrin, the slurry may also contain an additional dispersant such as ammonium naphthalene sulfonate, ammonium lignosulfonate, or an ammonium salt of a synthetic resin such as isobutylene/maleic anhydride. The concentration of the additional dispersant in the aqueous slurry is about 1.00% by weight for the ammonium naphthalene sulphate, and about 0.20% by weight for the ammonium lignosulfonate and the ammonium salt of a synthetic resin.

Alternatively, the slurry may contain dextrin and a pH controlling reagent such as ammonium hydroxide.

It is understood that the optimum concentration levels for the dextrin, conventional dispersants, or the pH modifier additive levels can be determined for each specific application on the basis of coal type, desired slurry properties, and economics by one skilled in the art.

For a fuller understanding of the nature and advantages of the present invention, reference is made to the following examples wherein the effectiveness of dextrin is shown when used as: 1) a coal surface pretreatment, 2) a co-additive with the conventional dispersants described above, and 3) a dispersant used only in combination with the pH controlling reagent. These examples are given merely to illustrate the invention and are not to be construed in a limiting sense.

In each of the examples to follow, feedstocks representative of the types of coals which could be utilized in high-intensity combustion systems were prepared using heavy-media cleaning techniques. Following the heavy-media cleaning at a ½-inch particle top size, the coals were ground in a ball mill and then in a stirred ball mill at about 20 weight percent coal without any dispersing additives to achieve a particle top size of about 30 microns. Thereafter, the micronized coals were filtered to a moisture content suitable for the preparation of coal-water slurry fuel. The resulting product was a filter cake.

The ground filter cakes and coarser cleaned coals were utilized in different ways as exemplified in the following examples to determine the effectiveness of dextrin as a dispersant.

EXAMPLE I

Coal Surface Pretreatment using Dextrin

Preground 30-micron top-size Indiana VII heavy-media float product coal (about 7.5 percent ash) was used for dextrin pretreatment tests. Three different slurries were prepared from treated and untreated coal filter cakes using a 1.0 percent dosage of A-23 ammonium naphthalene sulfonate dispersant manufactured by the Diamond Shamrock Corporation, Morristown, N.J.

One slurry was prepared with a variable-speed mixer using the as-is, untreated (i.e., uncoated) filter cake. A second slurry was prepared using the pretreatment technique (dilution to 10 percent coal and high-speed mixing) without addition of dextrin (blank pretreatment). A third slurry was prepared from a filter cake which had been pretreated using 0.1 weight percent STADEX® 120 dextrin in a high-speed blender for 2 minutes at 10 percent coal concentration. The pretreated coal was filtered to a moisture content similar to the as-is, untreated filter cake prior to slurry preparation.

The results are summarized in Table 1 which shows that the weight percent of coal at a slurry viscosity of 500 cp increased after scrubbing the coal surfaces in deionized water (blank pretreatment), and that the weight percent of coal increased further from the addition of dextrin. During testing, the viscosity of the slurry was kept constant by the removal of water in response to the addition of dextrin.

TABLE 1

Preparation of a Coal-Water Slurry from Filter Cakes Using Dextrin Pretreatment and A-23 Ammonium Naphthalene Sulfonate Dispersant. (Indiana VII Heavy-Media Float Product Coal)

| Dextrin Pretreatment | Dispersant | Weight % Coal at 500 cp Viscosity |
|---|---|---|
| none | 1.0% | ~41 |
| 0% STADEX® 120 (blank) | 1.0% | *46.5 |
| 0.1% STADEX® 120 | 1.0% | 47.5 |

*Weight percent of coal after scrubbing the coal surface in deionized water.

Tests similar to those described above using a Kentucky 4a physically-cleaned coal feedstock (4.5 percent ash) and STADEX® 126 dextrin. The results are summarized in Table 2 which shows that pretreatment with 0.1 weight percent of dextrin helped to increase solids loading from 53.3 to 54.7 percent coal when measured at a comparable slurry viscosity of 200 cp.

TABLE 2

Preparation of a Coal-Water Slurry from Filter Cakes Using Dextrin Pretreatment and A-23 Ammonium Naphthalene Sulfonate Dispersant. (Kentucky 4a Heavy-Media Float Product coal)

| Dextrin Pretreatment | Dispersant | Weight % Coal at 200 cp Viscosity |
|---|---|---|
| none | 1.0% | 53.4 |
| 0% STADEX® 126 (blank) | 1.0% | *53.3 |
| 0.1% STADEX® 126 | 1.0% | 54.7 |

*Weight percent of coal after scrubbing the coal surface in deionized water.

EXAMPLE II

Dextrin as a Co-Additive with a Conventional Dispersant

An Elkhorn seam heavy-media float product coal (about 1 percent ash) was used for these tests. Minus ⅛-inch coal was ground in a laboratory rod mill for 90 minutes in the presence of deionized water, conventional dispersants, and, in some cases, dextrin.

The results are summarized in Table 3 which shows that the STADEX® 126 dextrin enhanced the coal-water slurry dispersion characteristics as measured by the greater production of fines during grinding (i.e., greater % of coal particles less than 37 microns) without sacrificing the weight percent of coal in the slurry or the viscosity of the slurry.

TABLE 3

Preparation of a Coal-Water Slurry Using Dextrin and Conventional Dispersants. (Elkhorn Heavy-Media Float Product Coal)

| *Additives, Wt % | | | Product | Wt % Coal In |
|---|---|---|---|---|
| STADEX® 126 | **D-319-2 | **Tamol 165 | Particle Size, % <37 microns | Slurry at 500 cp viscosity |
| 0 | 0.20 | — | 81.5 | 59.4 |
| 1.0 | 0.20 | — | 92.2 | 59.6 |
| 0 | — | 0.20 | 86.3 | 60.4 |
| 1.0 | — | 0.20 | 90.8 | 60.2 |

*Additive dosages are based on active reagent and dry coal weight.
**D-319-2 is an ammonium lignosulfonate manufactured by Reed-Lignin, Greenwich, Connecticut. Tamol 165 is an ammonium salt of a synthetic resin, possibly isobutylene/maleic anhydride, manufactured by Rohm and Haas, Philadelphia, Pennsylvania.

Further tests revealed that the addition of dextrin after grinding reduced the viscosity of the resulting aqueous slurry (i.e., a desirable feature for the efficient transportation of the slurry). The results are summarized in Table 4 which shows that the incremental addition of dextrin to a slurry prepared using 0.20 weight percent of Tamol 165 dispersant resulted in significant reduction in viscosity.

It is understood that the viscosity readings for the slurry containing 58.0 weight percent coal were obtained by grinding the coal with no dextrin present (as represented by the 0 in Table 4) and subsequently adding dextrin in incremental values after the removal of the coal from the grinder. Additionally, it is understood that the viscosity readings for the slurry containing 61.3 weight percent coal were obtained by grinding the coal in the presence of a 0.10 weight percent of dextrin (as represented by the 0.10 in Table 4) and, subsequently, adding dextrin in incremental values after removal of the coal from the grinder.

TABLE 4

Effect of STADEX® 126 Dextrin Concentration on Elkhorn No. 3 Coal-Water Slurry Viscosity.

| Additive Concentration | | | Brookfield Viscometer Scale-Reading (T-B Measurement Spindle) | |
|---|---|---|---|---|
| Wt % Coal | Tamol 165 | STADEX® 126 | 50 rpm | 100 rpm |
| 58.0 | 0.20 | 0 (as-ground) | 86 | >95 |
| 58.0 | 0.20 | 0.01 | 81 | >95 |
| 58.0 | 0.20 | 0.06 | 57 | 91 |
| 58.0 | 0.20 | 0.16 | 45 | 59 |
| 58.0 | 0.20 | 0.36 | 15 | 34 |
| 58.0 | 0.20 | 0.86 | 7.5 | 19 |
| 58.0 | 0.20 | 1.11 | 4.8 | 16 |
| 58.0 | 0.20 | 1.36 | 4.8 | 14 |
| 61.3 | 0.20 | 0.10 (as-ground) | >95 | >95 |
| 61.3 | 0.20 | 0.11 | >95 | >95 |
| 61.3 | 0.20 | 0.16 | >95 | >95 |
| 61.3 | 0.20 | 0.26 | 75 | >95 |
| 61.3 | 0.20 | 0.46 | 20 | 55 |
| 61.3 | 0.20 | 0.96 | 11 | 36 |
| 61.3 | 0.20 | 1.21 | 1.5 | 36 |
| 61.3 | 0.20 | 1.46 | 1.5 | 36 |

EXAMPLE III

Dextrin as a Dispersant Used Only in Combination with a pH Controlling Reagent A coal-water slurry containing dextrin and ammonium hydroxide as a pH controlling reagent was prepared using a minus 30-micron Indiana VII heavy-media product filter cake.

The results are summarized in Table 5 which compares the effects of using no dextrin, ammonium hydroxide only, and dextrin with ammonium hydroxide. As shown therein, significant improvement in weight percent of solids loading at a slurry viscosity of 100 cp was achieved using dextrin in addition to a pH modifier.

As shown in Table 6, a slurry containing dextrin and ammonium hydroxide exhibited decreasing viscosity with increasing temperature, a desirable feature for many high-intensity combustion applications where slurry preheating is required. Measurements were made with a Fann ® Model 50C viscometer using a nitrogen gas overpressure to prevent moisture loss from the samples.

TABLE 5

Preparation of a Coal-Water Slurry Using Dextrin and Ammonium Hydroxide. (Indiana VII Heavy-Media Float Product Coal)

| Additive | pH | Weight % Coal at 100 cp Viscosity |
|---|---|---|
| none | 6 | 38 |
| ammonium hydroxide | 7 | 41.8 |
| ammonium hydroxide + 2% STADEX ® 126 | 7 | 44.8 |

TABLE 6

Effect of Temperature on Slurry Viscosity (Indiana VII Heavy-Media Float Product Coat Containing Dextrin and Ammonium Hydroxide)

| Temperature, °F. | Viscosity, cp at 500/sec shear rate |
|---|---|
| 90 | 492 |
| 124 | 344 |
| 213 | 340 |
| 302 | 296 |

What has been described therefore is an improvement in the dispersion of a coal-water slurry by the utilization of dextrin The dextrin may be applied as a coal-surface pretreatment, as a co-additive with other conventional dispersants, or as a dispersant used only with a pH controlling reagent.

The embodiments of the invention in which an exclusive property or privilege is claimed are defined as follows:

1. An aqueous slurry containing coal particles having a partial top size of about 30 microns and dextrin as a dispersant at a concentration between about 0.01% and about 2.00% by weight, and an additional dispersant selected from the group consisting of ammonium naphthalene sulfonate at a concentration of about 1.00% by weight, ammonium lignosulfonate at a concentration of about 0.20% by weight, or an ammonium salt of a synthetic resin at a concentration of about 0.20% by weight.

2. An aqueous slurry containing coal particles having a particle top size of about 30 microns, dextrin at a concentration of about 2.00% by weight, and a pH controlling reagent in an amount effective to maintain a pH of about 7.

3. A method of preparing an aqueous coal slurry containing coal particles having a particle top size of about 37 microns, dextrin, and an additional dispersant including the step of adding said dextrin and said additional dispersant during the grinding of the coal, said dextrin being present at a concentration of about 1.00% by weight and said additional dispersant comprising an ammonium lignosulfonate or an ammonium salt of a synthetic resin present at a concentration of about 0.20% by weight.

4. A method of preparing an aqueous slurry containing coal particles having a particle top size of about 30 microns, dextrin, and an additional dispersant including the step of adding said dextrin and said additional dispersant to a coal filter cake prior to said coal being introduced to a said slurry, said dextrin and said additional dispersant being added in an amount effective to disperse the coal in the slurry.

5. The method of claim 4, wherein said additional dispersant comprises ammonium naphthalene sulfonate and is present at a concentration of about 1.00% by weight.

6. The method of claim 3, further including the step of adding an additional amount of dextrin after the grinding of said coal.

7. The method of claim 6, wherein said additional amount of dextrin is added such that the concentration of said dextrin is between about 0.10% and about 1.46% by weight.

* * * * *